US005665963A

United States Patent [19]
Campbell

[11] Patent Number: 5,665,963
[45] Date of Patent: Sep. 9, 1997

[54] REFLECTIVE COLOR FILTER FOR COLOR CORRECTION OF PHOTODETECTOR FILTERS

[75] Inventor: David K. Campbell, Loveland, Colo.

[73] Assignee: Hewlett-Packard Company, Palo Alto, Calif.

[21] Appl. No.: 590,539

[22] Filed: Jan. 24, 1996

[51] Int. Cl.⁶ .................................................. G01J 3/50
[52] U.S. Cl. ...................... 250/226; 250/208.1; 358/512; 359/590
[58] Field of Search .................................. 250/226, 208.1, 250/208.2, 214.1, 229, 214 B, 559.18; 359/589, 590, 359, 565; 358/512, 515, 518; 356/319, 320

[56] References Cited

U.S. PATENT DOCUMENTS

| | | | |
|---|---|---|---|
| 4,721,999 | 1/1988 | Takemura et al. | 358/44 |
| 4,783,696 | 11/1988 | Neumann et al. | 358/75 |
| 5,019,703 | 5/1991 | Boyd et al. | 250/208.1 |
| 5,164,858 | 11/1992 | Aguilera, Jr. et al. | 250/226 |
| 5,272,518 | 12/1993 | Vincent | 250/226 |
| 5,285,271 | 2/1994 | Gennetten | 358/500 |
| 5,300,767 | 4/1994 | Steinle et al. | 250/208.1 |

OTHER PUBLICATIONS

"Designing A Scanner With Color Vision", K. Douglas Gennetten and Michael J. Steinle; Hewlett-Packard Journal; Aug. 1993; pp.52-58.

*Primary Examiner*—Que Le
*Attorney, Agent, or Firm*—Augustus W. Winfield

[57] ABSTRACT

A color filter system for an optical system, applicable to optical systems in color image scanners, copiers, video cameras and digital cameras. The optical system includes a photosensor array, transmissive color filters on the photosensor array and a corrective reflective filter adjacent to the photosensor array. The transmissive color filters on the photosensor array are imperfect, transmitting too much visible red as well as infrared. The adjacent reflective filter compensates by suppressing longer visible red wavelengths and infrared wavelengths. The combination provides color precision with cost and manufacturing advantages relative to attempting to provide precise transmissive filters on the photosensor array or relative to providing compensation filters elsewhere in the system.

3 Claims, 3 Drawing Sheets

REFLECTIVE COLOR FILTER FOR COLOR CORRECTION OF PHOTODETECTOR FILTERS

FIELD OF INVENTION

This invention relates generally to optical color imaging devices such as color image scanners, copiers and digital cameras and more specifically to reflective color correction of transmissive color filters used for color separation.

BACKGROUND OF THE INVENTION

Optical color image scanners use photodetectors to convert an image into an electronic signal suitable for use in copying, electronic display, storing or printing. Photosensor elements provide a voltage or current signal that varies with the light intensity impinging onto the photosensor element. Photosensors are not inherently color specific. Typically, a color image scanner uses one of two methods to measure specific color bands within broad spectrum incident light. In a first method, light passes through a color filter before impinging onto a photosensor element. In a second method, color separators (typically prism based) are used to separate broad spectrum light into physically separated bands of color. The first method, using filters, is of primary interest in the present application.

Video cameras (cameorders), digital cameras and similar devices often use a two dimensional matrix photosensor array in which there are many rows and columns of photosensor elements, each element being covered by an individual color filter. Document scanners and slide scanners often use a photosensor array in which there are three or four rows of photosensor elements, each row receiving light having a narrow bandwidth. Both types of photosensor arrays are of interest to the invention.

One purpose of a color image scanner is to provide a digital representation of an image that can then be displayed or printed, with the displayed or printed image appearing identical to the original to a human observer. Typically, a color scanner transforms the light from an individual picture element into three numbers, each number representing a dimensional value in a three dimensional color space. Displays or printers then transform the values into a different color space appropriate for display phosphors or printing pigments or dyes. See, for example, K. Douglas Gennetten and Michael J. Steinle, "Designing a Scanner with Color Vision," *Hewlett-Packard Journal*, August, 1993, pp 52–58. See also, U.S. Pat. No. 5,285,271, Digital Color Matrixing Circuit to K. Douglas Gennetten. Numerical values resulting from the photosensor signals must also be transformed to compensate for non-ideal filters and non-ideal illumination in the scanning process. Because of limited digitization, arithmetic roundoff, arithmetic truncation, and noise problems, arithmetic compensation is limited. Therefore, it is very important for the filters to be as close to ideal as possible. Ideally, color measurement systems match the human visual system. In particular, for the color red, human sensitivity peaks at wavelengths of about 660 nanometers and falls to nearly zero at about 700 nanometers.

Transmissive color filters are typically thin film organic dyes deposited directly onto the photosensor array, which in turn is typically fabricated on silicon in an integrated circuit process. While thin film organic dyes are well suited for an integrated circuit process, they are not the best technology for precise shaping of the filter characteristic. In general, organic dyes cannot provide a red filter having an ideal filter characteristic. In addition, organic dye filters typically transmit infrared wavelengths in addition to a narrow band in the visible wavelengths. Therefore, when using organic dye filters directly deposited onto photosensor arrays, additional filtering is needed elsewhere in the system. Lens coatings for suppressing infrared wavelengths are known. However, coating a curved lens surface is relatively expensive. Inserting additional filters in the light path is known. However, this adds an additional part. There is a need for a compensation filter having ease of manufacturing and low cost.

SUMMARY OF THE INVENTION

A reflective color filter is placed adjacent to transmissive filters on a photosensor array. Cost is minimized because the reflective filter is small and flat. A dichroic filter is used to provide precise tuning of the filter characteristic for visible red wavelengths in addition to suppressing infrared wavelengths. The combination of transmissive organic dye filters on the photosensor array and the adjacent reflective dichroic filter provides cost and ease of manufacturing advantages relative to alternative configurations.

DETAILED DESCRIPTION OF THE PREFERRED EMBODIMENT OF THE INVENTION

Figure 1:
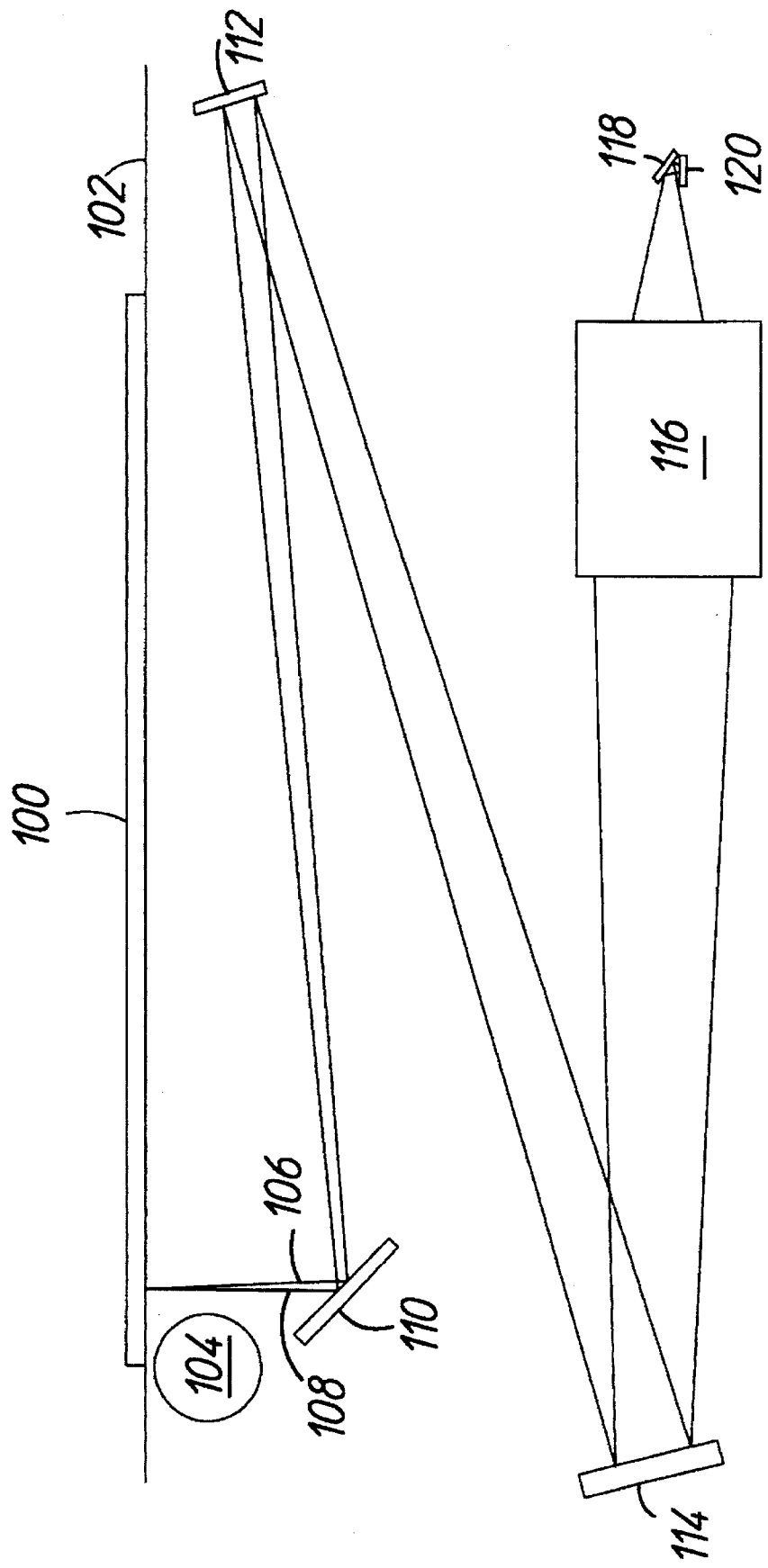
FIG. 1 is a side view of a color image scanner in accordance with the invention.

FIG. 1 illustrates a color image scanner. A document 100, for example a color photograph, is laying face down on a transparent platen 102. A lamp 104 illuminates a line on the document 100. Light rays (106, 108) from any point on the line on the document (actually three bundles of fight rays from three separate points on three separate lines as illustrated in more detail in FIG. 2) follow a folded light path, diverging to a first mirror 110, to a second mirror 112, to a third mirror 114, through a focusing lens system 116, then converging to a reflective filter 118 and finally onto a sensor army 120. In other scanner embodiments, there are many other arrangements of similar elements. In particular, two lamps may be used and there may be fewer or more mirrors between the document and the lens. In the present application, the primary elements of interest are reflective filter 118 and sensor array 120. In the design illustrated, a mirror is required at the location of reflective filter 118 so that the only incremental cost is the filter coating.

FIG. 1 illustrates a vertical plane through a scanner. In a perpendicular dimension (horizontal plane in and out of the page), mirror 110 is approximately the width of the scanner. A typical scanner width is about 230 millimeters. In contrast, the corresponding horizontal width of photosensor array 120 and mirror 118 is less than 22 millimeters. Therefore, the surface area of reflective filter 118 is much smaller than mirrors 110, 112 and 114 and the surface area of reflective filter 118 is much smaller than any lens surface within the lens system 116. Therefore, it is much more economical to coat mirror 118 than to coat any of the other mirrors or any of the lens surfaces.

Figure 2:
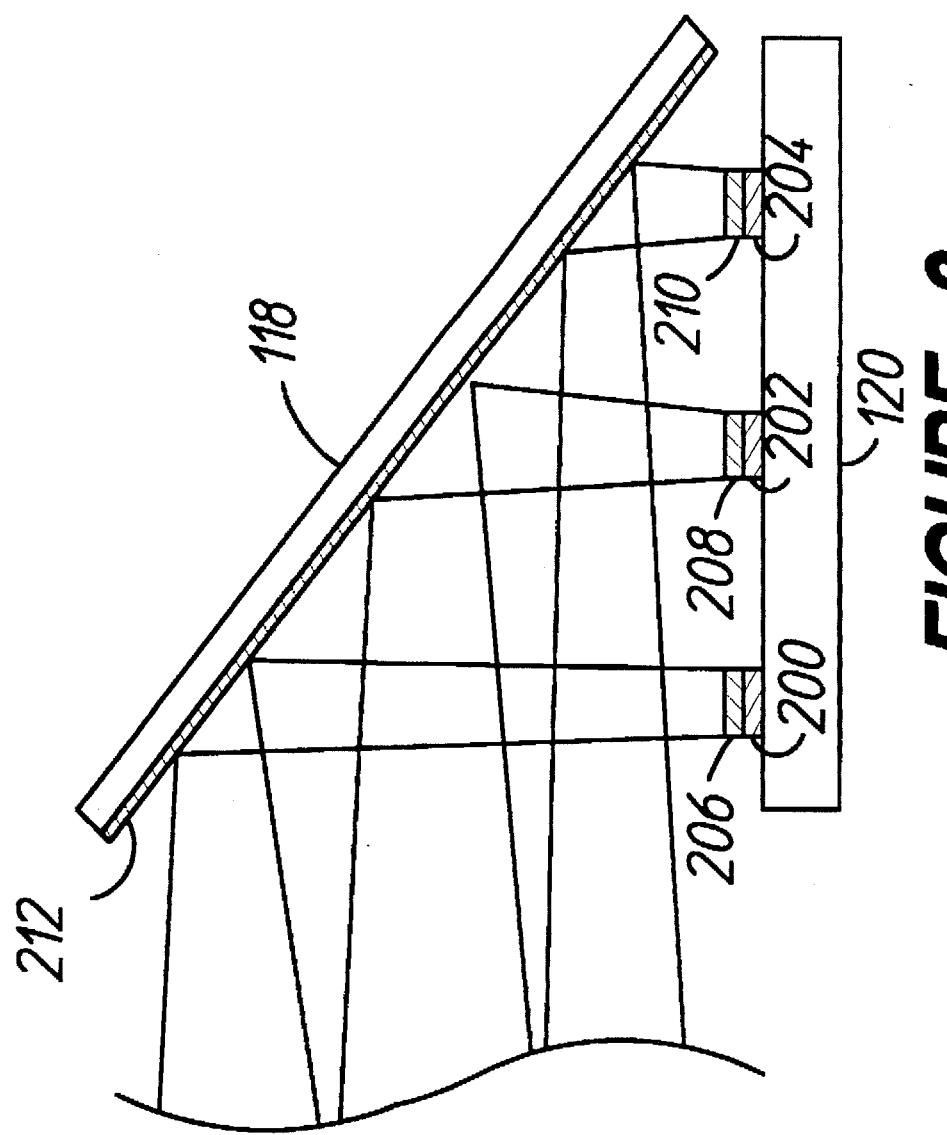
FIG. 2 is an expanded side view of a portion of FIG. 1 illustrating the reflective filter and the photosensor array.

FIG. 2 illustrates additional detail for photosensor array 120 and reflective filter 118. Photosensor army 120 has three rows of sensor elements (200, 202, and 204). Note that each sensor row receives light from a separate line on the original image (FIG. 1, 100). Color information extracted from at least two filter rows must be stored and later combined with the information from a third filter row to provide all three colors for a single line on the original image. Each row of sensor elements has a transparent color filter (206, 208 and 210), typically red, green and blue. In alternative arrangements, sensor array 120 may have three rows of sensor elements with color filters on two rows and no filter on the third, or sensor array 120 may have four rows with color filters on three rows and no filter on the fourth row.

Filters 206, 208 and 210 each pass a narrow band of visible light (typically rod, green, blue) and in addition transmit a substantial amount of infrared light. In addition, the rod filter transmits some visible rod wavelengths that are longer than 650 nanometers, resulting in a rod spectral characteristic that is too wide relative to an ideal characteristic. As discussed in the background section, a rod signal that includes unwanted wavelengths decreases precision in arithmetic computation of three dimensional color space values.

Reflective filter 118 is preferably a dichroic reflector, fabricated by evaporating multiple thin films of metal and/or dielectric materials 212 onto a polished surface. Suitable reflective filters are available, for example, from Optical Coatings Lab Inc., 2788 Northpoint Parkway, Santa Rosa, Calif. 95407.

Figure 3:
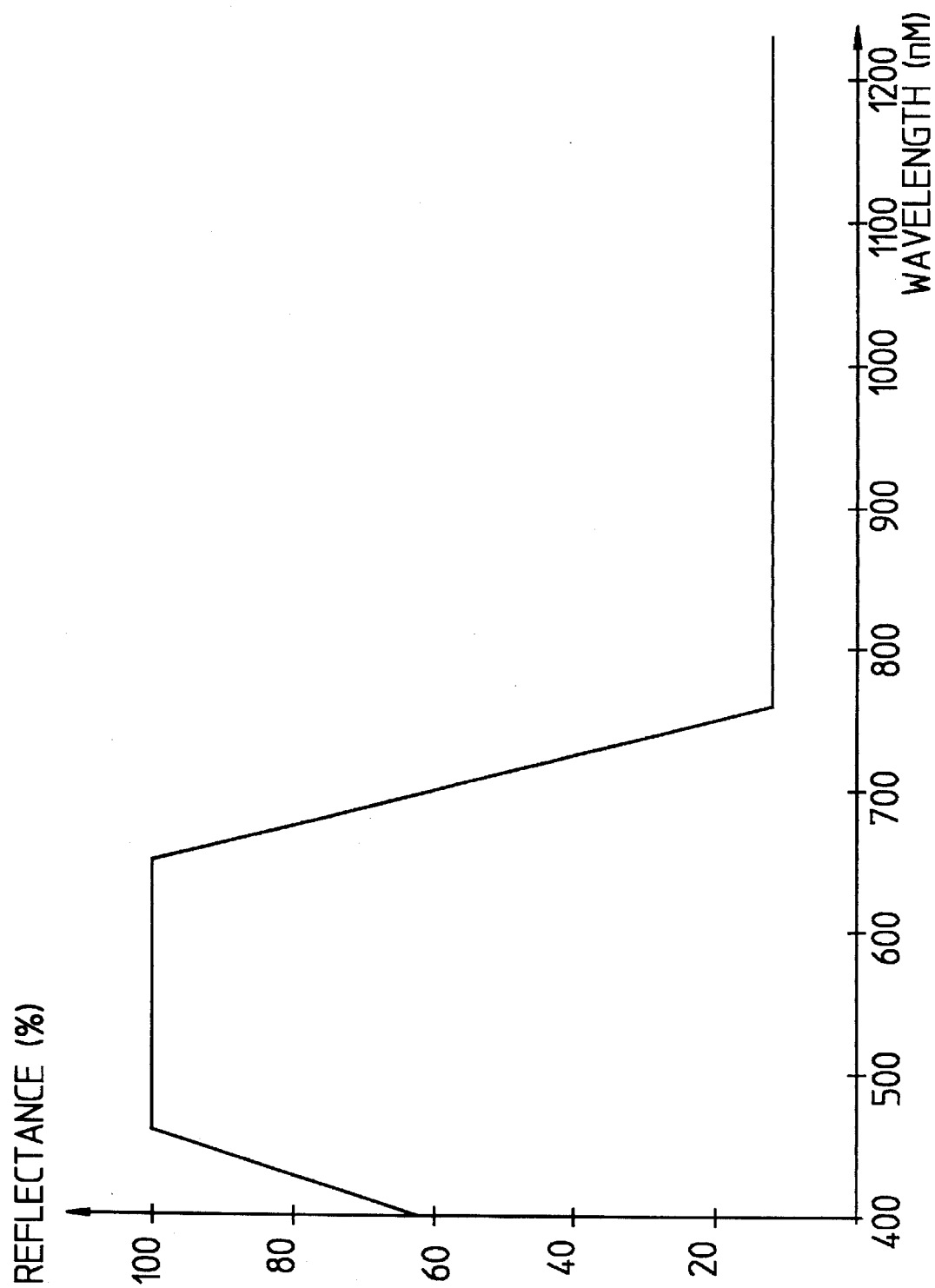
FIG. 3 is a plot of the spectral characteristics of the reflective filter of FIG. 1.

FIG. 3 illustrates the spectral characteristic of reflective filter 118. Note that reflective filter 118 is designed to have a cut-off corner at a wavelength of 650 nanometers and is designed to pass less than 15% of the intensity of all wavelengths longer than 760 nanometers. As a result, reflective filter 118 compensates for various non-ideal characteristics of filters 206, 208 and 210 with low incremental cost.

The combination of transmissive organic dye filters on the sensor array and dichroic reflective filters on the small adjacent mirror provide cost and manufacturing advantages over attempting to provide ideal filters on the sensor array or compensating filters elsewhere within the optical system. Note also that even though the example embodiment of FIG. 1 illustrates an image scanner, the invention is equally applicable to other imaging devices including video cameras, digital cameras and copiers. In any optical system in which there is an array of photosensor elements and filters, there may be cost and manufacturing advantages in using a combination of a precise filter on a small mirror and a less precise filter on the photosensor elements.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claim is:

1. An optical system comprising:

a photosensitive element;

a first optical filter on the photosensitive element, the first optical filter suppressing light having wavelengths longer than a first wavelength;

a reflective optical filter, adjacent to the photosensitive element, the reflective optical filter suppressing light having wavelengths longer than a second wavelength, the second wavelength shorter than the first wavelength; and wherein light reflects from the reflective optical filter through the first optical filter onto the photosensitive element, the reflective optical filter thereby preventing light having longer wavelengths than the second wavelength from impinging onto the photosensitive element.

2. The optical system of claim 1, the reflective optical filter suppressing light having infrared wavelengths.

3. The optical system of claim 1, the second wavelength being less than 760 nanometers.

* * * * *